United States Patent [19]

Liu et al.

[11] Patent Number: 5,500,198

[45] Date of Patent: Mar. 19, 1996

[54] COMPOSITE CATALYST FOR CARBON MONOXIDE AND HYDROCARBON OXIDATION

[75] Inventors: Wei Liu, Cambridge; Maria Flytzani-Stephanopoulos, Winchester, both of Mass.

[73] Assignee: Massachusetts Institute of Technology, Cambridge, Mass.

[21] Appl. No.: 142,519

[22] Filed: Oct. 26, 1993

[51] Int. Cl.⁶ .......................... C01B 31/18; C01B 31/20; B01D 53/62; B01D 53/72

[52] U.S. Cl. .................. 423/246; 423/245.3; 423/247; 423/437 M

[58] Field of Search ..................... 423/245.3, 246, 423/247, 437 M; 502/304, 303

[56] References Cited

U.S. PATENT DOCUMENTS

| | | | |
|---|---|---|---|
| 3,768,259 | 10/1973 | Carnahan et al. | 60/276 |
| 3,819,535 | 6/1974 | Huba et al. | 252/462 |
| 3,897,367 | 7/1975 | Lauder | 252/462 |
| 3,914,389 | 10/1975 | Haacke | 423/263 |
| 4,218,297 | 8/1980 | Henault et al. | 204/195 |
| 4,927,799 | 5/1990 | Matsumoto et al. | 502/303 |
| 5,063,193 | 11/1991 | Bedford et al. | 502/304 |
| 5,075,276 | 12/1991 | Ozawa et al. | 502/304 |
| 5,137,862 | 8/1992 | Mackrodt et al. | 502/303 |
| 5,263,998 | 11/1993 | Mackrodt et al. | 431/7 |
| 5,286,698 | 2/1994 | Carberry et al. | 502/303 |
| 5,326,737 | 7/1994 | Kay et al. | 502/400 |
| 5,384,301 | 1/1995 | Flytzani-Stephanopoulos et al. | 502/304 |

FOREIGN PATENT DOCUMENTS

| | | | |
|---|---|---|---|
| 0492945 | 7/1992 | European Pat. Off. | 502/304 |
| 3737419 | 5/1988 | Germany | 502/303 |
| 60-7537 | 2/1985 | Japan . | |
| 1307449 | 12/1989 | Japan | 502/304 |
| 3161052 | 7/1991 | Japan | 423/245.3 |
| 4330941 | 11/1992 | Japan | 423/245.3 |

OTHER PUBLICATIONS

English Translation of Japan Patent Document No. 60–7537 by Sato et al. Published on 25 Feb. 1985 Entitled "An Exhaust Gas Purification Catalyst".

*Primary Examiner*—Gary P. Straub
*Assistant Examiner*—Timothy C. Vanoy
*Attorney, Agent, or Firm*—Wolf, Greenfield & Sacks

[57] ABSTRACT

A method and composition for the complete oxidation of carbon monoxide and/or hydrocarbon compounds. The method involves reacting the carbon monoxide and/or hydrocarbons with an oxidizing agent in the presence of a metal oxide composite catalyst. The catalyst is prepared by combining fluorite-type oxygen ion conductors with active transition metals. The fluorite oxide, selected from the group consisting of cerium oxide, zirconium oxide, thorium oxide, hafnium oxide, and uranium oxide, and may be doped by alkaline earth and rare earth oxides. The transition metals, selected from the group consisting of molybdnum, copper, cobalt, maganese, nickel, and silver, are used as additives. The atomic ratio of transition metal to fluorite oxide is less than one.

7 Claims, No Drawings

COMPOSITE CATALYST FOR CARBON MONOXIDE AND HYDROCARBON OXIDATION

This invention was made with government support under Grant No. DE-FG-92PC92534 awarded by the Department of Energy. The government has certain rights in the invention.

BACKGROUND OF THE INVENTION

1. Field of the Invention

The present invention relates to a novel oxidation catalyst for the removal of carbon monoxide and hydrocarbon compounds from industrial gas streams.

2. Description of the Prior Art

Carbon monoxide, a partial combustion product of many fuels, is emitted by many sources such as gas turbine power plants, reciprocating engines, coal-fired boilers, heaters, and the like. Hydrocarbons are either concomitantly emitted with carbon monoxide, as incomplete combustion products of fuels, or generated by other industrial processes such as refinery dry gas and incinerator exit gas. Catalytic oxidation of these pollutants to carbon dioxide and water over a wide temperature range can achieve the continually decaying pollution limits set by law economically. In fact, catalysts have been used in the U.S. for automobile emissions control and gaseous emissions from industrial facilities. To date, the oxidation catalysts commercially used for these purposes are dominantly supported precious metals, such as platinum and palladium. The precious metal catalyst is superior to other catalysts in that it combines high activity and resistance to water vapor poisoning. However, the high cost of precious metals and their propensity to sulfur poisoning are drawbacks of this type of catalyst system. The high cost becomes a primary issue in processes where the metals cannot be recovered, for example, as with the platinum-containing carbon monoxide oxidation catalyst in the Fluid Catalytic Cracking (FCC) process—the most important unit in oil refineries. In the FCC process, carbon monoxide is formed in a regenerator during the combustion of the coke-containing catalyst from a riser reactor. Formation of carbon monoxide needs to be eliminated to prevent the regenerator and exit flue gas pipeline from the damage caused by the post-combustion of carbon monoxide, as well as to meet environmental regulations. A supported-precious metal is currently being used as the preferred carbon monoxide oxidation catalyst. Different from catalysts used in automobile catalytic converters, the carbon monoxide oxidation catalyst is injected into the FCC unit in particulate form, and is eventually carried away with the exit gas stream, and thus the catalyst cannot be recovered. The retention time of the catalyst in the FCC unit is significantly shorter than the life time of an automobile's catalytic converter. On the other hand, there is significant amount of sulfur dioxide formed in the regenerator. Sulfur dioxide poisons the oxidation catalyst usually by forming sulfates on the surface; however, the sulfates may be reduced in the reducing atmosphere when the catalyst is transferred to the riser reactor. Therefore, it would be of great advantage to substitute the expensive precious metal catalyst used in the FCC process with an inexpensive material.

Substitution of precious metals used in oxidation catalysts with ordinary base metals has long been of extensive interest in the catalysis field. For example, a layered catalyst comprising alumina with an inner layer of metal oxide and an outer layer of copper oxide is disclosed by Stephens et al., in U.S. Pat. No. 3,226,340. The use of copper chromite with other metal oxides for the treatment of exhaust gases from internal combustion engines is disclosed by Stiles, in U.S. Pat. No. 3,230,034. An active oxidation catalyst was prepared by depositing layers of oxides of copper, cerium and chromium with cerium oxide as the middle layer on an alumina support as described by Schenker et al., in U.S. Pat. No. 3,789,022. Since the 1970's, perovskite-type mixed oxides ($ABO_3$) have attracted great attention as heterogeneous oxidation catalysts. Notably, $R_{1-x}Pb_xMnO_3$ and $RCoO_3$ (where R denotes the rare earth elements La, Pr, and Nd) compounds were intensively studied because they showed high promise to substitute platinum for CO oxidation. (See, for example, R.J.H. Voorhoeve et al., *Science*, Vol. 177, 353–4, 1972 and *Science*, Vol. 195, 827–33, 1977). The Spinel oxide ($AB_2O_4$) is another well-studied class of mixed oxides. For example, Hopcalite catalysts, based on manganese and copper oxides, have long been known as carbon monoxide oxidation catalysts. However, most of base-metal catalysts reported show inferior performance to the precious metal catalysts in the oxidation of CO in terms of catalytic activity, stability, and resistance towards poisoning by water and sulfur compounds. Recently, a carbon monoxide removing catalyst comprising an alumina support with deposited platinum and iron, cobalt, nickel, manganese, copper, chromium, tin, lead or cerium was reported (Japanese Patent 61 035 853).

Accordingly, it is an object of this invention to provide a highly active and stable oxidation catalyst, containing no precious metal components, for oxidation and removal of carbon monoxide and hydrocarbon compounds.

SUMMARY OF THE INVENTION

The present invention provides a method and composition for the complete oxidation of carbon monoxide and/or hydrocarbons with an oxidizing agent over a catalyst which displays high activity and stability.

The method involves reacting carbon monoxide with an oxidizing agent in the presence of a metal oxide composite catalyst to produce carbon dioxide. Alternatively, hydrocarbon compounds, concomitantly emitted with carbon monoxide, or emitted independently from an industrial process, are reacted with an oxidizing agent in the presence of the metal oxide catalyst to produce carbon dioxide and water.

The metal oxide composite catalyst has the following empirical formula:

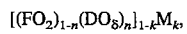

$$[(FO_2)_{1-n}(DO_\delta)_n]_{1-k}M_k,$$

wherein:

$FO_2$ is a fluorite-type oxide; $DO_\delta$ represents a dopant oxide or a mixture thereof; M is a transition metal, or a mixture thereof; n is a number having a value from 0.0 to about 0.35; $\delta$ is a number having a value from about 1 to about 2; and k is a number having a value from 0.0 to about 0.5.

Other objects and features of the present invention will become apparent from the following detailed description.

DETAILED DESCRIPTION OF THE INVENTION

The present invention involves oxidation of carbon monoxide and hydrocarbons to carbon dioxide and water.

The method of the present invention includes reacting carbon monoxide and/or hydrocarbons with an oxidizing agent in the presence of a catalyst to produce carbon dioxide and/or water.

The carbon monoxide is typically emitted as a combustion off-gas from gas turbine power plants, reciprocating engines, coal-fired boilers, heaters, and the like. The hydrocarbon compounds are either concomitantly emitted with carbon monoxide as an incomplete combustion product, or generated independently from another industrial process.

Air or other oxygen-containing gases are used to convert the carbon monoxide to carbon dioxide and, if present, hydrocarbon compounds to carbon dioxide and water. It is also noted that for carbon monoxide oxidation, water can also be used as an oxidizing agent in what is termed the water-gas shift reaction, producing carbon dioxide and hydrogen.

The present invention provides a novel metal-oxide composite catalyst for the oxidation of carbon monoxide and hydrocarbons having the following empirical formula:

$$[(FO_2)_{1-n}(DO_\delta)_n]_{1-k}M_k \qquad (I)$$

wherein $FO_2$ is a fluorite-type oxide; $DO_\delta$ represents a dopant oxide or a mixture thereof taken from the group consisting of Group IIA oxides, Group IIIB oxides, or lanthanide oxides; M is a transition metal or a mixture thereof; n is a number having a value from 0.0 to about 0.35; k is a number having a value from 0.0 to about 0.5; and $\delta$ is a number having a value from about 1 to about 2.

A fluorite is a common ionic structure known to those of skill in the art. Typically, the stoichiometry of a fluorite structure is about 1:2 (metal:oxygen), and oxides of large tetravalent (4+) cations frequently belong to the fluorite-type structure. In the above noted empirical formula (I), the fluorite-type oxide is selected from the group consisting of cerium oxide, thorium oxide, hafnium oxide, tantalum oxide, zirconium oxide, and uranium oxide. These oxides are well known for their high oxygen vacancy concentration and high ionic conductivity properties. (See, for example, H. L. Tuller and P. K. Moon, Materials Science and Engineering, 171–91, 1988). These oxides, except for tantalum oxide, belong to the extrinsic oxygen ionic conductor, in that their oxygen vacancy and conductivity properties are usually enhanced by doping other impurity ions into their crystal lattices. As noted above in the empirical formula (I), the selected fluorite-type oxides may be doped with either a divalent metal oxide (DO) or a trivalent metal oxide ($DO_{1.5}$). Thus, the dopant (D) is an element selected from the group consisting of magnesium, calcium, strontium, barium, scandium, yttrium, lanthanum, praseodymium, neodymium, samarium, europium, gadolinium, terbium, dysprosium, holmium, erbium, thulium, ytterbium, and lutetium, or a mixture thereof. To keep the fluorite-type crystal structure, the dopant content should not exceed 35 atomic percent.

It is believed that oxygen atom and electron transfer processes are usually involved in the oxidation/reduction reaction. An active oxidation catalyst not only provides suitable surface sites for the chemisorption of reacting species, but also activates the oxygen molecule and/or facilitates the atomic and electronic transfers. Thus, the oxygen ion conducting materials inside the bracket of empirical formula (I) serve as an oxygen activation and exchange medium in the above composite catalyst during a redox reaction. Because these oxides are ceramic materials, they are chemically and thermally stable in acrid reacting atmosphere such as that of flue gas exhaust. However, these materials usually have low electronic conductivity and surfaces sites of low activity for the chemisorption of reacting species. The active transition metals are added into the oxygen ion conductor to improve the electronic transfer properties and provide additional active surface sites for chemisorption. The transition metals widely used in conventional catalyst systems are typical candidates, such as chromium, manganese, iron, cobalt, nickel, copper, molybdenum, silver, and the like.

The catalyst of present invention differs from conventional mixed oxide oxidation catalysts by using the active transition metals as additives in atomic contents not exceeding 50%. The fluorite-type oxide is the major component serving as the backbone of the catalyst. The active transition metals promote the catalytic reactivity of the oxygen conducting material and are, in turn, stabilized in the matrix of the fluorite oxide. The catalyst formulation of present invention combines atomic, electronic, and surface adsorption properties together to provide a stable and active oxidation catalyst. The transition metals have to be finely dispersed inside the matrix or on the surface of the oxygen ion conducting material to display the concerted effect during the reaction. The transition metals may exist as metals or oxides in the forms of isolated atom, atomic cluster, and small particle. Since previous studies of the fluorite-type oxides have mainly focused on the use of the alkaline earth and rare earth oxide dopants, there is little information available to date about the properties of the mixture of the fluorite oxide and transition metal or oxide.

The above metal-oxide composite catalysts can be prepared by conventional catalyst preparation methods. For example, the bulk catalyst can be prepared by either coprecipitating the mixed solutions of the involved elements or impregnating the transition metals on a porous oxygen ion conducting material. The supported catalyst can be prepared by depositing both the ion conducting materials and the transition metals on a catalyst support, such as alumina, silica, cordierite, and the like. The transition metals in the final product must be finely dispersed so that the concerted electronic and atomic transfer effect is displayed during the catalytic reaction by the intimate contact of the two kinds of materials. Accordingly, non-uniform compositions and/or extensive particle growth of the metal (or oxide) phase should be avoided during preparation. The selection of a preparation method largely depends on the practical application. For example, for the FCC application, the active component may be impregnated on the surface of fine support particles such as alumina-silica gels so that the resulting catalyst particle has similar fluidity and attrition properties to the cracking catalyst. For the vehicle exhaust gas control, the present oxidation catalyst component may be coated on a honeycomb monolith support together with another catalyst component specific for NOx reduction.

The bulk catalyst typically has a surface area of about 1.0 $m^2/g$ to about 100 $m^2/g$. If supported, the catalyst is preferably in the range of 0.5 to 50% by weight, and has a surface area in the range of about 10 $m^2/g$ to about 500 $m^2/g$. The physical form of the composite catalysts of the present invention can include granules, tablets, extrusions, pellets, honeycomb monoliths, and the like. Various other active phase-on-support configurations may also be used as would be apparent to those of skill in the art.

The present invention is further illustrated by the following examples which are intended to be illustrative in nature and are not to be construed as limiting the scope of the invention.

EXAMPLE

The preparation of a metal oxide composite catalyst of the present invention was examined.

Approximately 0.0045 moles of copper nitrate, $Cu(NO_3)_2.3H_2O$, (Johnson Matthey, Inc.; West Deptford, N.J.) and 0.0255 moles of cerium nitrate, $Ce(NO_3)_3.6H_2O$, containing about 2 atomic percent lanthanum (Aldrich Chemical Company; Milwaukee, Wis.) were dissolved in 200 ml deionized water. The solution was then heated to 75° C. At this temperature, 22 ml of 2.0M ammonium carbonate, $(NH_4)_2CO_3$, (Fisher Scientific Company) was added dropwise during vigorous stirring. The resulting carbonate precipitate was filtered and washed twice with hot water. The precipitate cake was then dried at room temperature for 12 hours and then calcined at 650° C. for 4 hours. The calcined solid was then crushed and sieved, to particles of 35–100 mesh size. The resulting $Ce_{0.85}(La)Cu_{0.15}O_x$(#1) composite catalyst has a specific surface area of 30 $m^2/g$. X-ray powder diffraction revealed the existence of only fluorite-type crystal phase.

EXAMPLE II

The preparation of another metal oxide composite catalyst of the present invention was examined.

Approximately 0.0003 moles of copper nitrate, $Cu(NO_3)_2.6H_2O$, containing about 2 atomic percent lanthanum, were combined with an equivalent amount of ammonium carbonate to form a precipitate which was dried, calcined, crushed, and sieved by the procedure of Example I. The resulting $Ce_{0.99}(La)Cu_{0.010}O_x$ catalyst had a specific surface area of 57 $m^2/g$. X-ray powder diffraction revealed the existence of only fluorite-type crystal phase.

EXAMPLE III

The preparation of another metal oxide composite catalyst of the present invention was examined.

Approximately 0.015 moles of copper nitrate, $Cu(NO_3)_2.3H_2O$, and 0.015 moles of cerium nitrate, $Ce(NO_3)_3.6H_2O$, containing about 2 atomic percent lanthanum, were combined with equivalent amount of ammonium carbonate to form a precipitate which was dried, calcined, crushed, and sieved by the procedure of Example I. The resulting $Ce_{0.5}(La)Cu_{0.50}O_x$ catalyst had a specific surface area of 51.6 $m^2/g$. X-ray powder diffraction revealed the existences of fluorite-type crystal phase and small amount of CuO crystal phase.

EXAMPLE IV

The preparation of another metal oxide composite catalyst of the present invention was examined.

Approximately 0.0045 moles of copper nitrate, $Cu(NO_3)_2.3H_2O$, and 0.0255 moles of cerium nitrate, $Ce(NO_3)_3.6H_2O$, containing about 2 atomic percent lanthanum, were combined with equivalent amount of ammonium carbonate for form a precipitate which was dried, calcined, crushed, and sieved by the procedure of Example I except for the use of 50° C. precipitation temperature. Resulting $Ce_{0.85}(La)Cu_{0.15}O_x$(#2) catalyst had a specific surface area of 33 $m^2/g$. X-ray powder diffraction revealed the existence of only fluorite-type crystal phase.

EXAMPLE V

The preparation of another metal oxide composite catalyst of the present invention was examined.

Approximately 0.006 moles of cobalt nitrate hydrate, $Co(NO_3)_2.xH_2O$, (Aldrich) and 0.024 moles of cerium nitrate, $Ce(NO_3)_3.6H_2O$, containing about 2 atomic percent lanthanum, were combined with equivalent amount of ammonium carbonate to form a precipitate which was dried, calcined, crushed, and sieved by the procedure of Example I. The resulting $Ce_{0.8}(La)Co_{0.2}O_x$ catalyst had a specific surface area of 30.1 $m^2/g$. X-ray powder diffraction revealed the existence of only fluorite-type crystal phase.

EXAMPLE VI

The preparation of another metal oxide composite catalyst of the present invention was examined.

Approximately 0.03 moles of cerium nitrate, $Ce(NO_3)_3.6H_2O$, containing about 2 atomic percent lanthanum, was combined with equivalent amount of ammonium carbonate to form a precipitate which was dried, calcined, crushed, and sieved by the procedure of Example I. The resulting $CeO_2(La)$ catalyst had a specific surface area of 29.1 $m^2/g$.

EXAMPLE VII

The preparation of another metal oxide composite catalyst of the present invention was examined.

Approximately 0.0045 moles of copper nitrate, $Cu(NO_3)_2.3H_2O$, 0.02295 moles of zirconium dinitrate oxide, $ZrO(NO_3)_2.xH_2O$, (Johnson Matthey) and 0.00255 moles of yttrium nitrate pentahydrate, $Y(NO_3)_3.5H_2O$, (Aldrich) were combined with equivalent amount of ammonium carbonate to form a precipitate which was dried, calcined, crushed, and sieved by the procedure of Example I, but, the particles of above 250 mesh size were saved for catalytic testing. The resulting $[Zr_{0.9}Y_{0.1}]_{0.85}Cu_{0.15}O_x$ catalyst had a specific surface area of 65 $m^2/g$. X-ray powder diffraction revealed the existence of only fluorite-type crystal phase.

EXAMPLE VIII

The preparation of another metal oxide composite catalyst of the present invention was examined.

Approximately 0.006 moles of copper nitrate, $Cu(NO_3)_2.3H_2O$, and 0.024 moles of zirconyl chloride $ZrOCl_2.8H_2O$, (Johnson Matthey) were combined with equivalent amount of ammonium carbonate to form a precipitate which was dried, calcined, crushed, and sieved by the procedure of Example I, but the particles above 250 mesh size were saved. The resulting $Zr_{0.8}Cu_{0.2}O_x$ catalyst had a specific surface are of 17.8 $m^2/g$. X-ray powder diffraction revealed the existence of only fluorite-type crystal phase.

EXAMPLE IX

The preparation of another metal oxide composite catalyst of the present invention by an impregnation method was examined.

A $CeO_2$ support, having particle sizes between 35 and 100 mesh, was prepared by the decomposition of 99.9% purity $(CH_3CO_2)_3Ce.xH_2O$ (Aldrich) at 750° C. for 3 hours. The resulting $CeO_2$ had a specific surface area of 22 $m^2/g$ and a void volume about 0.9 cc/g. The $CeO_2$ support was then impregnated by using the incipient wetness method with 0.531M copper nitrate solution. The wetted sample was dried at 90° C. for 12 hours and then calcined at 650° C. for 4 hours. The resulting impregnated catalyst, $CuO_x/CeO_2$, had a specific surface area of 20 $m^2/g$.

EXAMPLE X

The catalytic activity for the oxidation of carbon monoxide to carbon dioxide by oxygen ($2CO+O_2 \rightarrow 2CO_2$) was evaluated in a vertical packed bed reactor consisting of a 0.6 cm I.D. quartz tube, with a quartz frit mounted at the middle of the tube for supporting the catalyst. The reactor was heated inside a Lindberg furnace coupled with a temperature controller. A K-type thermocouple was inserted inside the quartz tube up to contacting the top layer of the catalyst bed to monitor the reaction temperature. The catalysts prepared in Examples I–IX were evaluated. Approximately 150 mg of the catalyst was loaded into the reactor, which results in a packed catalyst bed of about 0.14 cc for the cerium-containing catalyst and about 0.05 cc for the zirconium-containing catalyst, respectively. A gas stream, at a flow rate of 100 Sccm, containing 2% CO, and 16.8% $O_2$, by volume, and the balance $N_2$, was introduced into the reactor at room temperature. The reaction temperature was raised by a step of about 30° C., after the steady-state reaction was reached at each temperature. The experimental results are presented in Table I.

TABLE I

Catalytic Activity for Carbon Monoxide Oxidation

| Catalyst Tested | $T_{50\%}$(°C.)[a] | $T_{95\%}$(°C.)[b] |
|---|---|---|
| $CeO_2(La)$ | 355 | 435 |
| $Ce_{0.99}(La)Cu_{0.01}O_x$ | 150 | 190 |
| $Ce_{0.85}(La)Cu_{0.15}O_x$(#1) | 90 | 105 |
| $Ce_{0.85}(La)Cu_{0.15}O_x$(#2) | 65 | 80 |
| $Ce_{0.5}(La)Cu_{0.5}O_x$ | 70 | 100 |
| $CuO_x/CeO_2$ | 75 | 90 |
| $Ce_{0.8}(La)Co_{0.2}O_x$ | 145 | 180 |
| $[Zr_{0.9}Y_{0.1}]_{0.85}Cu_{0.15}O_x$ | 130 | 160 |
| $Zr_{0.8}Cu_{0.2}O_x$ | 125 | 165 |

[a]denotes the temperature on the top of the catalyst bed when 50% of CO conversion was achieved.
[b]denotes the temperature on the top of the catalyst bed when 95% of CO conversion was achieved.

EXAMPLE XI

It is known that methane is the most refractory of hydrocarbon compounds for oxidation. The catalytic activity for the oxidation of methane to carbon dioxide and water by oxygen ($CH_4+2O_2 \rightarrow CO_2+2H_2O$) was evaluated in the packed bed reactor described in Example X. Approximately 150 mg of the catalyst was used and the gas stream had a flow rate of 100 Sccm, consisting of 1.8% $CH_4$, 17.0% $O_2$, by volume, and the balance $N_2$. The experimental results are presented in Table II.

TABLE II

Catalytic Activity for Methane Oxidation

| Catalyst Tested | $T_{50\%}$(°C.) | $T_{95\%}$(°C.) |
|---|---|---|
| $CeO_2(La)$ | 550 | 660 |
| $Ce_{0.85}(La)Cu_{0.15}O_x$(#2) | 445 | 535 |
| $Ce_{0.8}(La)Co_{0.2}O_x$ | 530 | 600 |
| $[Zr_{0.9}Y_{0.1}]_{0.85}Cu_{0.15}O_x$ | 480 | — |
| $Zr_{0.8}Cu_{0.2}O_x$ | 440 | 540 |
| $CuO_x/CeO_2$ | 550 | 650 |

EXAMPLE XII

Water vapor, usually present in exhaust gas streams, poisons base metal oxide catalysts. The effect of water in carbon monoxide oxidation on the catalysts of present invention was evaluated in the packed bed reactor as noted in Example X. Water vapor was introduced by bubbling air through a water bath and collected by a cold trap at the outlet of the reactor. Approximately 150 mg of the catalyst was used. The inlet gases comprised 47 Sccm water vapor and 100 Sccm dry gas consisting of 80 cc/min air and 20 cc/min 10% $CO/N_2$. Thus, the gas compositions in the reactor were 32% $H_2O$, 1.35% CO, 11.4$O_2$, by volume, and the balance $N_2$. The experimental results are presented in Table III.

TABLE III

Effect of Water Vapor on the Catalytic Activity for Carbon Monoxide Oxidation

| Catalyst Tested | T(°C.) | Test Time (hr) | Conversion (%) Init. | Conversion (%) Final |
|---|---|---|---|---|
| $Ce_{0.99}(La)Cu_{0.01}O_x$ | 320 | 13 | 99 | 0 |
| $Ce_{0.85}(La)Cu_{0.15}O_x$(#1) | 320 | 39 | 99 | 99 |
| $Ce_{0.5}(La)Cu_{0.5}O_x$ | 340 | 15 | 99 | 80 |
| $Ce_{0.8}(La)Co_{0.2}O_x$ | 320 | 16 | 99 | 99 |
| $[Zr_{0.9}Y_{0.1}]_{0.85}Cu_{0.15}O_x$ | 340 | 28 | 99 | 99 |

EXAMPLE XIII

Sulfur dioxide, usually originating from fuels such as coal and petroleum, poisons oxidation catalysts. The catalytic activity of carbon monoxide oxidation in the presence of sulfur dioxide on the catalyst of the present invention was evaluated in the packed bed reactor as noted in Example X. Approximately 150 mg of the catalyst was used and the gas stream had a flow rate of 100 Sccm, consisting of 2.0% CO, 14.7% $O_2$, 0.012% $SO_2$, by volume, and the balance $N_2$. The test was carried out stepwise from low to high temperatures. The test temperature was raised after a certain test time period at each temperature. The experimental results are presented in Table IV.

TABLE IV

Effect of Sulfur Dioxide on the Catalytic Activity for Carbon Monoxide Oxidation

| Catalyst Tested | T(°C.) | Test Time (hr) | Conversion (%) Init. | Conversion (%) Final |
|---|---|---|---|---|
| $[Zr_{0.9}Y_{0.1}]_{0.85}Cu_{0.15}O_x$ | 507 | 1.0 | 99 | 75 |
|  | 557 | 16 | 81 | 70 |
|  | 610 | 45 | 86 | 76 |
|  | 709 | — | 98 | — |
| $Ce_{0.85}(La)Cu_{0.15}O_x$(#2) | 512 | 21 | 99 | 94 |
|  | 605 | 48 | 98 | 95 |

This Example indicates that, while a slight decrease in CO conversion was noted over the test time, the catalysts of the present invention can be used for carbon monoxide oxidation in the presence of sulfur dioxide. This is important because carbon monoxide and sulfur dioxide are frequently both present in combustion products of many fuels.

EXAMPLE XIV

Parametric studies on carbon monoxide oxidation on the $Ce_{0.85}(La)Cu_{0.15}O_x$(#2) catalyst were carried out in the packed bed reactor as noted in Example X with dry gases. The results are summarized in following tables.

TABLE V(a)

Variation of Carbon Monoxide Conversion with Space Velocity in the Presence of Excess Oxygen[e]

| F/V(v/v/h) | $40 \times 10^3$ | $82 \times 10^3$ | $126 \times 10^3$ | $210 \times 10^3$ |
|---|---|---|---|---|
| x at 125° C. (%) | 99 | 99 | 99 | 99 |

[e] other conditions: 2% CO, 17% $O_2$.

TABLE V(b)

Variation of Carbon Monoxide Conversion with Its Inlet Concentration[d]

| CO % | 2.0 | 1.21 | 0.644 | 0.30 |
|---|---|---|---|---|
| x at 125° C. (%) | 99 | 99 | 99 | 97 |

[d] other conditions: space velocity = $210 \times 10^3$ v/v/h, 16–20% $O_2$.

TABLE V(c)

Effect of Oxygen to Carbon Monoxide Ratio on Carbon Monoxide Conversion[e]

| [$O_2$]/[CO] | 32 | 12 | 2.36 | 0.85 | 0.52 |
|---|---|---|---|---|---|
| x at 125° C. (%) | 99 | 99 | 99 | 98 | 98 |

[e] other conditions: space velocity = $210 \times 10^3$ v/v/h, 0.6% CO.

TABLE V(d)

Variation of Carbon Monoxide Conversion with Space Velocity under Near Stoichimometric [O2]/[CO] Ratio[f]

| F/V(v/v/h) | $210 \times 10^3$ | $430 \times 10^3$ | $665 \times 10^3$ | $1.3 \times 10^6$ |
|---|---|---|---|---|
| x at 125° C. (%) | 98 | 96 | 93 | 91 |
| x at 167° C. (%) | 99 | 99 | 99 | 99 |

[f] other conditions: 0.6% CO, [$O_2$]/[CO] = 0.52.

These studies indicate that the catalysts of the present invention are effective for CO conversion over a broad range of space velocities and gas compositions.

EXAMPLE XV

The catalytic activity of $Ce_{0.85}(La)Cu_{0.15}O_x$(#2) for carbon monoxide oxidation by water ($CO+H_2O \rightarrow CO_2+H_2$), otherwise known as the water-gas-shift reaction, was tested in the packed bed reactor as noted in Example X. Water vapor was introduced by bubbling nitrogen through a water bath and collected by a cold trap at the outlet of the reactor. Approximately 150 mg of the catalyst was used. The gas flow on a dry basis is 100 Sccm containing 2% CO by volume. The experimental results are presented in the following table.

TABLE VI

Percentage Conversion of Carbon Monoxide

| Temperature (°C.) | 216 | 315 | 362 | 458 |
|---|---|---|---|---|
| $F_{H2O}$ = 21 Sccm | 61 | 94 | 99 | 99 |
| $F_{H2O}$ = 47 Sccm | 41 | 81 | 88 | 92 |

$F_{H2O}$ denotes the water vapor flow rate.

This Example indicates that the catalysts of the present invention are effective for CO conversion using water vapor as the oxidizing agent (water-gas shift reaction).

Although particular embodiments of the invention have been described in detail to illustrate the principles of the present invention, various modifications may be made without departing from the spirit and scope of the invention. Accordingly, the invention is not to be limited except as by the appended claims.

What is claimed is:

1. A method for the oxidation of carbon monoxide to carbon dioxide, comprising:

reacting carbon monoxide with an oxidizing agent in the presence of a metal oxide composite catalyst, wherein said metal oxide composite catalyst has the following empirical formula:

$$[(FO_2)_{1-n}(DO_\delta)_n]_{1-k}M_k$$

wherein:

$FO_2$ is cerium oxide or zirconium oxide $DO_\delta$ represents a dopant oxide or a mixture thereof selected from oxides of the group consisting of scandium, yttrium, lanthanum, praseodymium, neodymium, samarium, europium, gadolinium, terbium, dysprosium, holmium, erbium, thulium, ytterbium, lutetium and Group IIA metals;

M is copper or a mixture of copper with a transition metal selected from the group consisting of chromium, manganese, iron, cobalt, nickel, molybdenum and silver;

n is a number having a value from 0.0 to about 0.35;

δ is a number having a value from about 1 to about 2; and k is a number having a value greater than 0.0 to about 0.5.

2. The method of claim 1, wherein said catalyst is unsupported and comprises a specific surface area from about 1.0 m²/g to about 100 m²/g.

3. The method of claim 1 wherein said catalyst is supported and comprises from about 0.5 to about 50 percent by weight, and has a surface area from about 10 m²/g to about 500 m²/g.

4. The method of claim 1 wherein said oxidizing agent is selected from the group consisting of air, oxygen, water vapor, and mixtures thereof.

5. A method for complete oxidation of hydrocarbons to carbon dioxide and water, comprising:

reacting hydrocarbon compounds with oxygen-containing gases in the presence of a metal oxide composite catalyst, wherein said metal oxide composite catalyst has the following empirical formula:

$$[(FO_2)_{1-n}(DO_\delta)_n]_{1-k}M_k$$

wherein:

$FO_2$ is cerium oxide or zirconium oxide;

$DO_\delta$ represents a dopant oxide or a mixture thereof selected from oxides of the group consisting of scandium, yttrium, lanthanum, praseodymium, neodymium, samarium, europium, gadolinium, terbium, dysprosium, holmium, erbium, thulium, ytterbium, lutetium and Group IIA metals;

M is copper or a mixture of copper with a transition metal selected from the group consisting of chromium, manganese, iron, cobalt, nickel, molybdenum and silver;

n is a number having a value greater than 0.0 to about 0.20;

$\delta$ is a number having a value from about 1 to about 2; and k is a number having a value greater than 0.0 to about 0.5.

6. The method of claim 5 wherein said catalyst is unsupported and comprises a specific surface area from about 1.0 m²/g to about 100 m²/g.

7. The method of claim 5 wherein said catalyst is supported and comprises from about 0.5 to about 50 percent by weight, and has a surface area from about 10 m²/g to about 500 m²/g.

* * * * *